United States Patent [19]

Bacs, Jr. et al.

[11] Patent Number: 5,546,139
[45] Date of Patent: Aug. 13, 1996

[54] MOVING IMAGERY PROJECTION SYSTEM

[76] Inventors: Aron Bacs, Jr., 5828 Wye Oak Commons Ct., Burke, Va. 22015; Ward H. Davis, 5950 Bent Pine Dr. #248; Douglas A. McCullough, 5964 Bent Pine Dr. #264, both of Orlando, Fla. 32822

[21] Appl. No.: 82,415

[22] Filed: Jun. 28, 1993

[51] Int. Cl.[6] .................................................. H04N 5/74
[52] U.S. Cl. ............................ 348/754; 348/744; 348/36
[58] Field of Search .................................... 348/744, 745, 348/746, 36, 37, 38, 754, 115, 121, 123; 358/60, 63, 231; 395/125; 359/455, 619, 621, 626; H04N 5/74, 9/31, 3/22, 3/23

[56] References Cited

U.S. PATENT DOCUMENTS

| | | |
|---|---|---|
| 3,278,752 | 10/1966 | Brixner . |
| 3,320,424 | 5/1967 | Olson et al. . |
| 3,510,658 | 5/1970 | Rabedeau . |
| 3,699,244 | 10/1972 | Cohen et al. ............................ 348/36 |
| 3,861,806 | 1/1975 | Born . |
| 4,056,720 | 11/1977 | Williams, Jr. et al. . |
| 4,100,571 | 7/1978 | Dykes et al. . |
| 4,123,675 | 10/1978 | Moskowitz et al. . |
| 4,200,003 | 4/1980 | Miller . |
| 4,246,603 | 1/1981 | Wolff ...................................... 348/36 |
| 4,297,723 | 10/1981 | Whitby . |
| 4,347,507 | 8/1982 | Spooner . |
| 4,357,023 | 11/1982 | Yamamura . |
| 4,611,245 | 9/1986 | Trias . |
| 4,763,280 | 8/1988 | Robinson et al. . |
| 4,786,167 | 11/1988 | Rothoone et al. . |
| 4,833,528 | 5/1989 | Kobayashi ............................ 348/754 |
| 4,871,231 | 10/1989 | Garcia, Jr. . |
| 4,943,871 | 7/1990 | Miyagawa . |
| 4,979,030 | 12/1990 | Murata .................................. 348/750 |
| 4,992,880 | 8/1991 | Trias . |
| 5,081,882 | 1/1992 | Kogure . |
| 5,170,250 | 12/1992 | Ledebuhr . |
| 5,255,082 | 10/1993 | Tamada ................................. 348/750 |

Primary Examiner—Safet Metjahic
Assistant Examiner—Chris Grant
Attorney, Agent, or Firm—Baker & Botts, L.L.P.

[57] ABSTRACT

A projection system for projecting computergraphic images onto a domed or spherical viewing surface. An intense beam of coherent light is color and intensity modulated and deflected in a pair of cartesian axes prior to being projected through a wide angle lens array. Because the light beam is deflected before entering the wide angle lens array, greater angles of deflection are possible. The images are generated by rapidly changing the deflection of an intense spot of light which is projected onto the viewing surface at a rate above the viewer's flicker rate. This wide angle lens array may include a scan flattening lens array by which the image can be focused onto a spatial image focal plane before it is projected through a wide angle lens.

38 Claims, 5 Drawing Sheets

MOVING IMAGERY PROJECTION SYSTEM

BACKGROUND OF THE INVENTION

1. Field of the Invention

This invention relates to moving imagery projection systems and in particular to systems for projecting images generated by computergraphic technology and formed by an intense light beam or beams on a geometric, e.g., curvilinear, domed, or spherical, viewing surface. The invention is particularly suitable for use in planetariums to augment existing starfields and other conventional incandescent projection devices.

2. Description of the Related Art

The combination of state-of-the-art computergraphic technology with various images of projection equipment has produced a variety of projection systems for generating images on a viewing surface. The computergraphic technology has allowed operators to create, retrieve, and manipulate graphic images on laptop or desktop computers. See U.S. Pat. No. 4,763,280 to Robinson et al.; U.S. Pat. No. 4,347,507 to Spooner. Using a variety of light sources, these images have been projected on viewing surfaces having a variety of geometric shapes for a varies of purposes. Nevertheless, these systems suffer from significant limitations. For example, as the angle of deflection of the image-generating light beam increases, the images tend to lose resolution, e,g., to become increasingly fuzzy, especially at the edges of the viewing surface. Consequently, the intensity of the images also decreases. Further, in order to project images on a curvilinear viewing surface, it is necessary to greatly increase the angle of deflection of the projected images. This too has caused degradation of the quality of the images.

Perhaps, the two most common uses for these related art systems are as entertainment displays and simulation devices. See U.S. Pat. No. 4,347,507 to Spooner; U.S. Pat. No. 4,100,571 to Dykes et al. In both uses, however, the same problems arise—namely, how to maintain image resolution and intensity and still project onto a curvilinear viewing surface without unacceptable distortion. Conventional viewing surfaces have comprised mosaics of substantially flat viewing surfaces. Such viewing surfaces often require the use of separate projection channels for each flat viewing surface. Even when a curvilinear viewing surface is used, mosaic projection techniques are sometimes employed. See U.S. Pat. No. 4,297,723 to Whitby. Such projection systems, however, can not take full advantage of the seamlessness of the curvilinear viewing surface and its other inherent advantages, such as the lack of discontinuities in the image as the projection system slews the image across the viewing surface. Other problems with a mosaic presentation arise from imperfect seam matching, contrast or color matching, and brightness matching. Imperfections in any of these areas are readily noticed by viewers, and because even slight matching imperfections are generally noticeable on large projections, it is very difficult to eliminate these problems. Further, the seamless presentation possible from a curvilinear viewing surface is easier to watch, e.g., causes less eye strain, and creates a more realistic presentation, and continuous curvilinear viewing surfaces may also be easier to manufacture.

Related art projection systems have not been able to successfully project sufficiently distinct and intense graphic images on a domed or spherical viewing surface. Some systems, such as that disclosed in U.S. Pat. No. 4,763,280 to Robinson et al., appear to disclose a system for achieving at least 180 degrees by 180 degrees or hemispherical projections. Others, such as that disclosed in U.S. Pat. No. 4,100,571 to Dykes et al., appear to disclose a system for achieving at least 360 degrees by 90 degrees. Neither of these systems, however, seems capable of projecting a sufficiently distinct and moving image on a spherical viewing surface without employing multiple projection channels.

As mentioned above, systems for projecting moving imagery on curvilinear viewing surfaces have found many military and training applications, especially in the field of flight simulation. In these applications, a realistic ambient environmental simulation or model board image may be projected onto a viewing surface, so that a pilot or other trainee may react to it and so that the image can be altered in response to the actions and reactions of the pilot or trainee. These images are commonly generated by means of a high-resolution cathode ray tube (CRT) or a high-resolution closed circuit television (CCT) projector. See U.S. Pat. No. 4,297,723 to Whitby; U.S. Pat. No. 4,100,571 to Dykes et al. Images generated in this manner, however, may also present significant disadvantages. First, such generating devices may be more suitable for mosaic presentations and suffer from the same mosaic limitations discussed above. Second, when a CRT or CCT projection is deflected or projected through a wide angle lens, an unacceptable amount of distortion may occur. The resulting image is fuzzy, blurred, or indistinct, which detracts from the training or simulation benefits of the system. Unlike these systems, images projected by the present invention may be similar to computergraphic images, rather than to the photo-realistic images generated by a system using CRT or CCT technology.

Various attempts have been made to develop projection systems which improve the projected images resolution and intensity. By using a laser beam, the intensity of which is modulated with video information by means of an acousto-optic cell, images have been scanned in a raster pattern onto a viewing surface. These systems may provide improved brightness due to the greater intensity inherent in a laser. See U.S. Pat. No. 3,992,718 to Driskell. Nevertheless, simply expanding the scanning window does not eliminate resolution problems, and the desired resolution can not be attained from his system without undesirable modifications. In order to avoid the resolution problems in a simulator, a CRT system must operate at a high bandwidth. The amount of bandwidth necessary increases, as the desired level of resolution increases. For example, television requires a bandwidth in the order of about 10 MHz to adequately transmit the signals necessary to generate the individual points in a 625 line television picture and to repeat the picture signals twenty-five (25) times per second. In order to generate a field of view of even 175 degrees by 75 degrees, therefore, might require a bandwidth of approximately 100 MHz to achieve the resolution demanded in modern flight simulation. This, however, places additional demands on the modulation of the laser beam and may make the system incompatible with digital image generating systems used in simulators.

The present invention allows a moving image to be projected with sufficient size, intensity, and clarity to fill an entire domed or spherical viewing surface, i.e., about 360 degrees by at least 180 degrees, and to avoid the loss of resolution and intensity experienced with other projection systems. Moreover, when the beam is static, instead of dynamic, an intense point of light is projected on the domed or spherical viewing surface.

SUMMARY OF THE INVENTION

It is an object of this invention to accurately project a computergraphic image or images through a wide angle projection system onto a geometric viewing surface with adequate resolution and intensity. It is a feature of this invention that electro-mechanical, acousto-optic, or electro-optic deflectors, rather than simply a raster scanner, can be used to increase the angle of deflection. It is an advantage of this feature that the angle of deflection can be increased without increasing processing power.

It is further an object of this invention that the computergraphic image(s) is (are) projected through a wide angle lens array. It is a feature of the invention that the wide angle lens array may comprise a single wide angle lens or a combination of lenses to achieve the wide angle projection of the images or a series of lens arrays which project the images onto a spacial image focal plane and from there through a wide angle lens or lens array onto the geometric viewing surface. It is an advantage of this feature that improved image quality can be obtained by projecting the images first onto a spacial image focal plane before projecting the image onto a domed or spherical viewing surface. Alternatively, it is a feature of this invention that the wide angle lens or lens array may comprise a holographic element for bending and deflecting the image forming light beams.

It is yet another object of this invention to project computergraphic image(s) on a domed or spherical viewing surface by deflecting an intense beam of light in essentially cartesian coordinates with at least one geometric conversion to account for the curvilinear shape of the viewing surface. It is a feature of this invention that the light beam is deflected along two axes of deflection and of this embodiment of this invention that the system has at least two deflectors. It is an advantage of this system that because images are created by rapidly moving a point of light over a viewing surface image complexity is only limited by the speed of deflection.

It is another object of this invention that the resolution and intensity of the projected image(s) is enhanced by delivering the light beam(s) to the wide angle lens array in an intense, coherent form. It is a feature of this invention that a source of intense, coherent light beams, such as a laser, may be used and that the light beams may be provided directly to the deflector module or may be carried from the source to the deflector module by means of fiber optic cables. It is an advantage of this feature that the light source may be at a distant location from the other components of the projection system.

The projection system of the present invention is used for projecting an image or images onto a geometric viewing surface located at a predetermined distance from and positioned at a predetermined orientation relative to the system. The system may further comprise a source of an intense light beam, such as a laser or an arc or a halogen lamp, e.g., a HeNe or Argon or Krypton laser or a xenon arc lamp; a deflector module for deflecting the light beam to vector coordinates in a pair of cartesian axes; and a wide angle lens array for increasing the exit angle of deflection of the image or images from the deflector module by a predetermined factor and projecting the image or images on the viewing surface. Moreover, the light beam may be provided directly to the deflector module or transferred to the deflector module by beam transfer means comprising a fiber optic path.

The light beam(s) may be mono- or poly-chromatic. An Argon laser inherently produces two-color laser radiation. Krypton lasers, however, produce polychromatic radiation. A broadband, gas ion laser may be used to produce an intense, coherent light beam. A broadband laser beam includes spectrally pure, i.e., discrete, and very intense frequencies. The broadband light beam produced by an arc or a halogen lamp, however, includes a broad spectrum of frequencies which may be characterized by a continuous spectrum punctuated by peaks of intense frequencies. Either type of broadband light beam may be suitable for use in the invention. Further, a dye laser or other tunable laser may also be suitable for use in this invention.

The deflector module of the projection system may comprise at least a pair of electro-mechanical deflectors which deflect the light beam to cartesian or vector coordinates in an x-axis and a y-axis. It may further comprise an x-galvanometer for deflecting the light beam in the x-axis and a y-galvanometer for deflecting the light beam in the y-axis. The deflector module may produce an exit angle of deflection of the deflected image in a range of about twenty (20) degrees to about eighty (80) degrees and the lens array increases the angle of deflection to a range of about 160 degrees to at least 180 degrees. At least one suitable very wide angle lens design is capable of increasing deflection up to about 210 degrees. Alternatively, the deflector module may comprise an acousto-optic or an electro-optic deflector or deflectors, which also deflect(s) the light beam to cartesian or vector coordinates in an x-axis and a y-axis.

The wide angle lens array of the projection system may comprise a first and a second lens array, such that the first lens array projects the image or images spatially on a focal plane, and the second lens array comprises a wide angle lens and projects the spatial image or images on the viewing surface. The viewing surface may surround and be about equidistant from the second lens array. Further, the geometric viewing surface may be domed or spherical.

The image or images projected by the system may be a computergraphic display defined in digital cartesian or vector coordinates which determine a trajectory for the display. The system may further comprise an image generating device for manipulating the display and a processor, such as an assembler, a compiler, a linkage editor, or a microprocessor, and/or a memory or data storage device for translating the digital cartesian or vector coordinates into analog signals and repetitively transmitting the display at a rate above the flicker rate. Flicker is a visual sensation produced by periodic fluctuations in light at rates ranging from about a few cycles per second to about a few tens of cycles per second i.e., the flicker rate. In addition, it may comprise a geometric correction device for correcting the analog signals, thereby compensating for the viewing surface's curvilinear shape and the distance and the orientation of the viewing surface relative to the system; amplification circuitry for controlling the deflection of the light beam; and beam transfer means for providing the light beam to the deflector module. Further, the beam transfer means may also comprise a fiber optic path with an input and an output coupling for transferring the light beam from the source to the deflector module via a focusing and collimating lens array. The fiber optic path may further comprise a graded or a stepped index fiber optic cable.

In yet another embodiment, the image or images may be a computergraphic display defined in analog vector coordinates which determine a trajectory for the display. It may further comprise an image generating device for manipulating the display; a processor for repetitively transmitting the display at a rate above the flicker rate; a geometric correction device for correcting the analog coordinates, thereby compensating for the viewing surface's geometry and the distance and the orientation of the viewing surface relative to the system; amplification circuitry for controlling the deflection of the light beam; and beam transfer means for providing the light beam to the deflector module. In both these embodiments, the geometric viewing surface may be domed or spherical, and the second lens array may be positioned at a location about equidistant from the viewing surface.

In still another embodiment, the image or images projected by the projection system may be a computergraphic display defined in digital vector coordinates which determine a trajectory for the display onto a curvilinear viewing surface. The system may comprise an image generating device for manipulating the display and a processor for translating the digital vector coordinates into analog signals and repetitively transmitting the display at a rate above the flicker rate. It also may include a geometric correction device for correcting the analog signals, thereby compensating for the curvilinear geometry of the viewing surface and amplification circuitry for controlling the deflection of the light beam.

As noted above, the beam transfer means may comprise a fiber optic path with an input coupling for accepting the light beam and an output coupling for delivering the light beam to a focusing and collimating lens array. It may further comprise a color modulator for separating the light beam into primary colors, modulating each of the primary colors independently, and recombining the primary colors into a single beam, whereby the amplification circuitry can synchronize the colors with the trajectory of the display. Alternatively, a poly-chromatic acousto-optic modulator (PCAOM) may be used to modulate each of the primary colors of the light beam. Instead of separating the light beam through filters and then modulating each color, e.g., primary color, through separate acousto-optic modulators, a PCAOM employs a single acousto-optic medium, such as an acousto-optic crystal, in which each color can be manipulated separately. The beam may also be coupled directly to the deflector module or to the color modulator.

Other objects, features, and advantages of the invention will be apparent when the detailed description of preferred embodiments of the invention and the drawings are considered.

DETAILED DESCRIPTION OF A PREFERRED EMBODIMENT

Figure 1A:
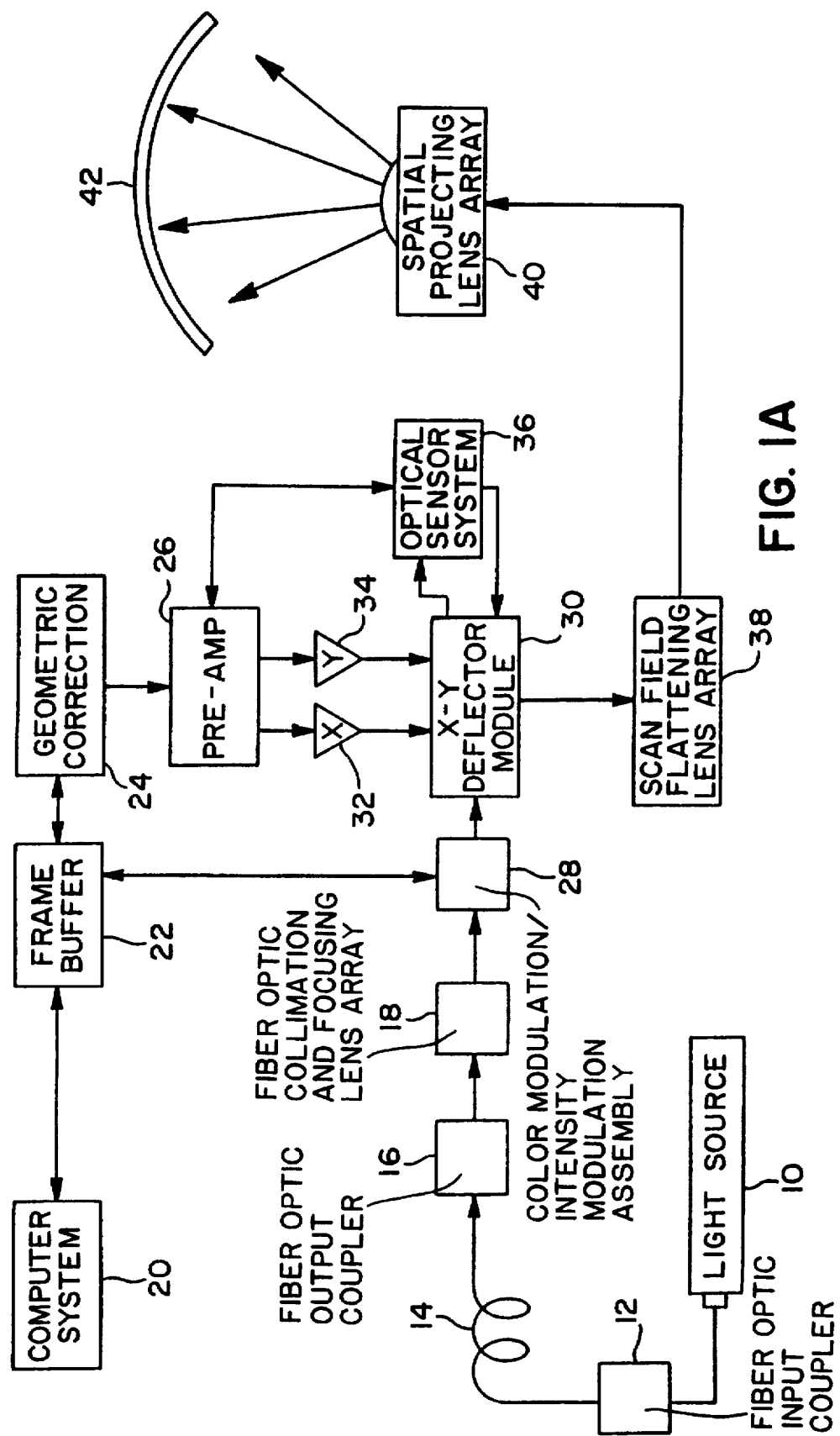
FIGS. 1A and 1B are block diagrams of preferred embodiments of the projection system.

Referring to FIG. 1A, a computer system 20 is used to generate, store, retrieve, manipulate, and display computergraphic images. These images may be generated in cartesian or vector coordinates, e.g., along orthogonal x, y, and z axes, and may be mono- or poly-chromatic, e.g., single color or beams of red, green, and blue (R-G-B) light. The images may also be manipulated to vary their intensity and orientation. In order to accomplish these purposes, computer system 20 may also comprise a keyboard, a monitor, a preview screen, a bit-pad, and a control console. Numerous commercially-available computer systems would be suitable for generating, storing, retrieving, manipulating, and displaying the computergraphic images. Further, a single-board microcomputer could produce suitable computergraphic images although the type and complexity of images that could be produced with such a microcomputer would be limited and, therefore, the uses of the system would be circumscribed.

Although various types and versions of suitable software are commercially available and will be well known to those of ordinary skill in the art, suitable software should generate a time code, e.g., simple or complex, and preferably should be suitable for use on an IBM compatible computer equipped with at least a 486 processor and operating at least 33 MHz. As noted above, however, image complexity is only limited by the speed of deflection, unless the speed of deflection exceeds the computer system's ability to generate images. For this reason, as attainable speeds of deflection increase, more powerful image generating computers may be desirable.

Images generated by computer system 20 are transferred to a vector frame buffer processor 22 which permits the images to be repetitively displayed at a threshold rate above the flicker rate, as perceived by the human eye. Because the images are displayed above the flicker rate, human viewers should not detect fluctuations in the images caused by their repetitive display. Further, frame buffer processor 22 translates the digital vector coordinates produced by computer system 20 into analog voltages, e.g., voltages representing frequency, amplitude, and geometric offset.

Nevertheless, in order to accurately project the computergraphic images through a wide angle projection system onto a domed or spherical viewing surface 42 at close proximity, the analog signals translated by frame buffer processor 22 are geometrically corrected by a geometric correction processor 24 to compensate for the extreme angles and distances between a second or spatial projecting lens array 40 having a wide angle lens and domed or spherical viewing surface 42. Without such geometric corrections, projected images might exhibit pin cushion, barrel, spherical, or other types of distortion. The specific geometric corrections implemented by geometric correction processor 24 are dependent upon the shape of a viewing surface 42.

A light source 10 for providing a beam or beams of very intense light may be used to produce a very small spot or point of light on viewing surface 42. While a variety of light sources could be suitable, a broadband, gas ion laser and in particular, a broadband, KrAr laser, is preferred. This light source is preferred because of the coherence of the light beam(s) produced. It also produces a poly-chromatic light beam having a narrow beam diameter with extremely low divergence. Light source 10 is focused by means of a fiber optic input coupler 12 onto the polished end of a single 50/125 micron, graded index, fiber optic cable 14. Transmitting the light beam through fiber optic cable 14 achieves two purposes: (1) second lens array 40 can be positioned equidistant from domed or spherical viewing surface 42 because light source 10 need not be located near lens array 40 and (2) light source 10 can transfer a very small and intense spot of light for projection onto viewing surface 42 with little divergence or loss of coherence. The small size and focusability of the light beam produced by light source 10 and transferred via fiber optic cable 14 aid in the projection of a small spot on viewing surface 42 and the rapid deflection of that light beam necessary to project clear images.

The light beam emerges from a fiber optic output coupler 16 and enters a fiber optic collimation and focusing lens array 18. Lens array 18 re-collimates, i.e., produces a plane of parallel light beams from a point light source, and focuses the beams. The beams are then directed to a modulator device (not shown), such as an acousto-optic or electro-optic modulator, which may be a component of a color modulation/intensity modulation assembly 28. Alternatively, assembly 28 may be located immediately after source 10, and the beams may be provided to assembly 28 directly from source 10 or via a fiber optic cable (not shown) while a preferred embodiment of the invention is depicted in FIG. 1A, space limitations in the vicinity of viewing surface 42 may dictate variations in the configuration of the system such as the relocation of components to positions distant from the viewing surface 42 by the use of optic fiber cables or other light transfer means or, when possible, reordering the components. See FIG. 1B.

If an acousto-optic modulator is used, the amplitude (intensity) and frequency (color) of the light beams entering the crystal device are modulated by the effects of acoustic waves on the crystal. Acousto-optic modulation is generally achieved by Bragg defraction, e.g., only one usable defracted beam is produced, although other methods may be used. Alternatively, if an electro-optic modulator is used, the amplitude (intensity) and frequency (color) of the light beam(s) entering the electro-optic medium, such as an electro-optic crystal or liquid, are modulated by the effects of electric fields on the medium. Electro-optic modulation may be achieved by changing the refractive index or the polarization properties of the medium by varying the applied voltage of the electric fields. Other methods may be used to modulate the beam(s), but changing the polarization properties is preferred when an electro-optic modulator is used.

After each of the primary color beams has been modulated independently, assembly 28 re-combines the beams into a single modulated beam. Signals from frame buffer 22 to assembly 28 control color selection and the intensity of the images. Moreover, frame buffer 22 helps ensure that when the beams are re-combined in assembly 28, assignment of full-color coordinates synchronized with the image's x-y axes trajectory is achieved. The light beam is then sent from assembly 28 to an x-y deflector module 30, which comprises at least two electro-mechanical, acousto-optic, or electro-optic deflectors—one for each of the x and y axes. As noted above, however, assembly 28 may be located at other positions in the system, such as immediately after light source 10. Regardless of its location, signals from frame buffer 22 to assembly 28 still control the color selection and intensity of the images. See FIG. 1B.

Analog signals, which have been geometrically corrected in geometric correction processor 24, are transmitted to amplification circuitry, including a preamplifier 26 and x-power amplifier 32 and y-power amplifier 34. By means of signals sent from preamplifier 26 via x-power amplifier 32 and y-power amplifier 34, the amplification circuitry also controls the deflection trajectory of the images to be projected. Further, the amplification circuitry can use feedback from an optical sensing system 36 to provide accurate beam position sensing in order to correct for non-linearities in the deflection of the beams by deflector module 30. Thus, sensing system 36 may operate as part of a feedback loop within the amplification circuitry.

The exit angle of deflection of the images, after they leave deflector module 30, is in a range of about twenty (20) degrees to about eighty (80) degrees. This angle can be increased to a range of about 160 degrees to at least 180 degrees by translation of the deflected images through a wide angle conversion lens (not shown) or a short focal length lens array (not shown), such as a "fish-eye" photographic lens. Second, lens array 40 should be capable of increasing the deflection of the light beam leaving the deflector module by a factor of about nine (9). Preferably, however, a first or scan field flattening lens array 38 may be placed between deflector module 30 and lens array 40. Lens array 38 improves the quality, i.e., decreases the size and increases the intensity, of the spot or point of light used to form the images on viewing surface 42.

Figure 2:
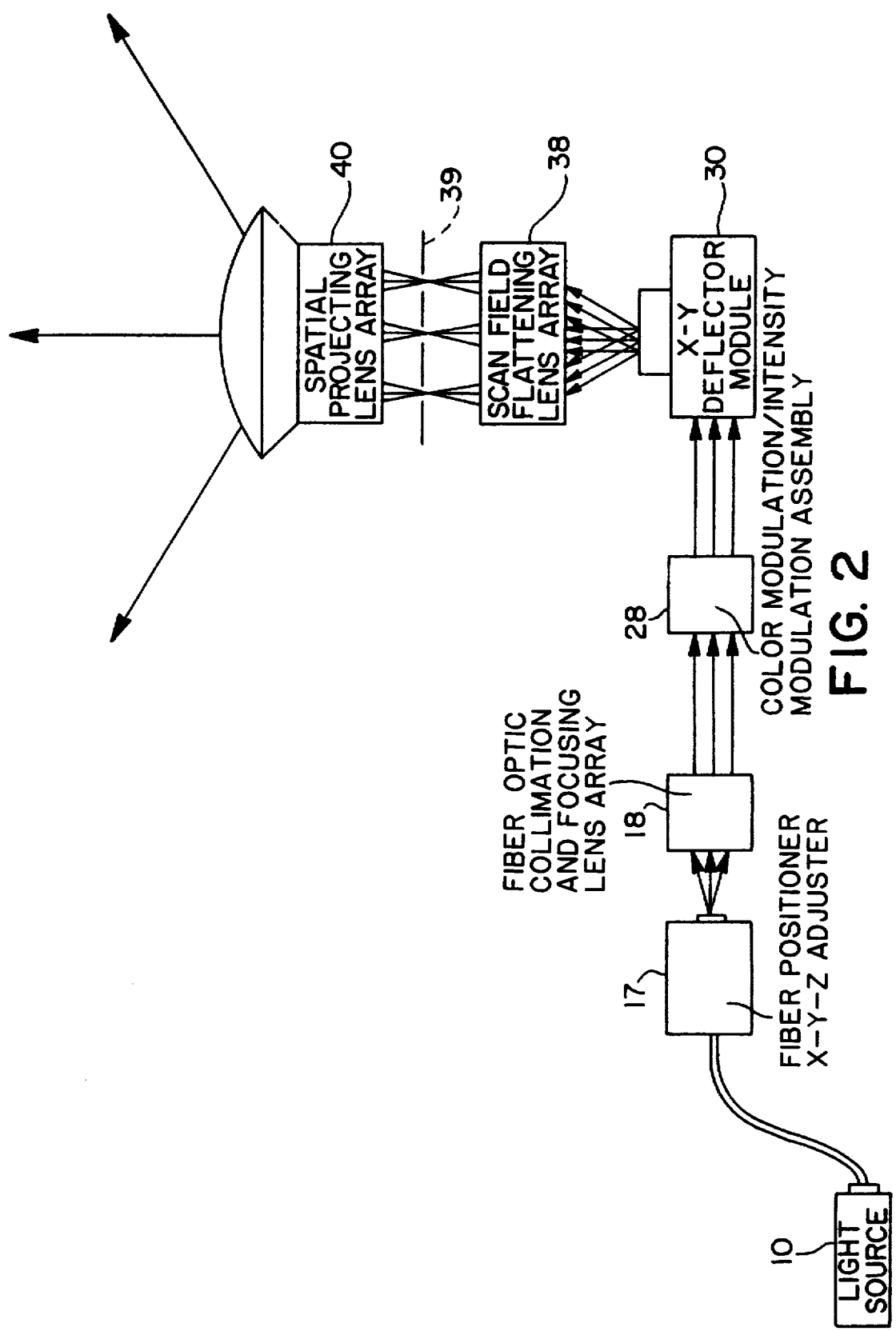
FIG. 2 is a block diagram of a preferred embodiment of the projection system depicting the projection of an image or images onto a spatial image focal plane.

Referring to FIG. 2, a preferred embodiment of projection system is depicted which discloses the use of the additional lens system in more detail. In this depiction, a beam or beams of light may be supplied by light source 10 to a fiber positioner x-y-z adjuster 17. Preferably, light source 10 is similar to that described with respect to FIG. 1A. Adjuster 17 aligns the fiber optic path precisely with re-collimator 18, performing a function similar to that of fiber optic output coupler 16, as disclosed in FIG. 1A.

After the light beam(s) leave adjuster 17, they are transferred to fiber optic collimation and focus lens array 18 and color modulation/intensity modulation assembly 28 and eventually into x-y deflector module 30. Nevertheless, the light beam(s) leaving x-y deflector module 30 enter scan field flattening lens array 38, and the images are formed as spatial images on a spatial image focal plane 39 located between lens arrays 38 and 40. The spatial images are then projected by second lens array 40 onto a domed or spherical viewing surface (not shown). First lens array 38 and focal plane 39 permit the images to be projected and maintained with a greater degree of focus and increased intensity over the entire viewing surface.

Figure 1B:
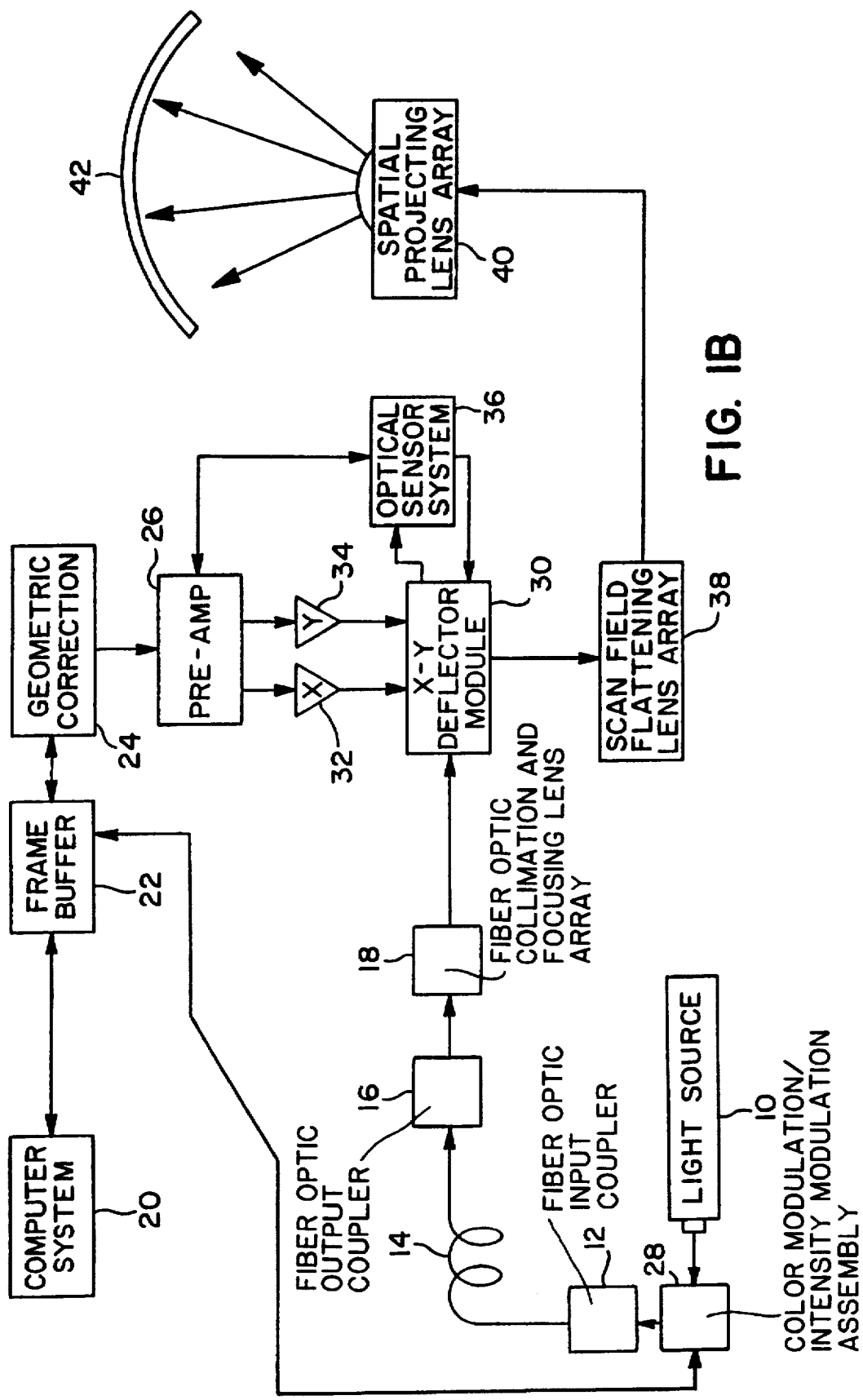
Figure 3:
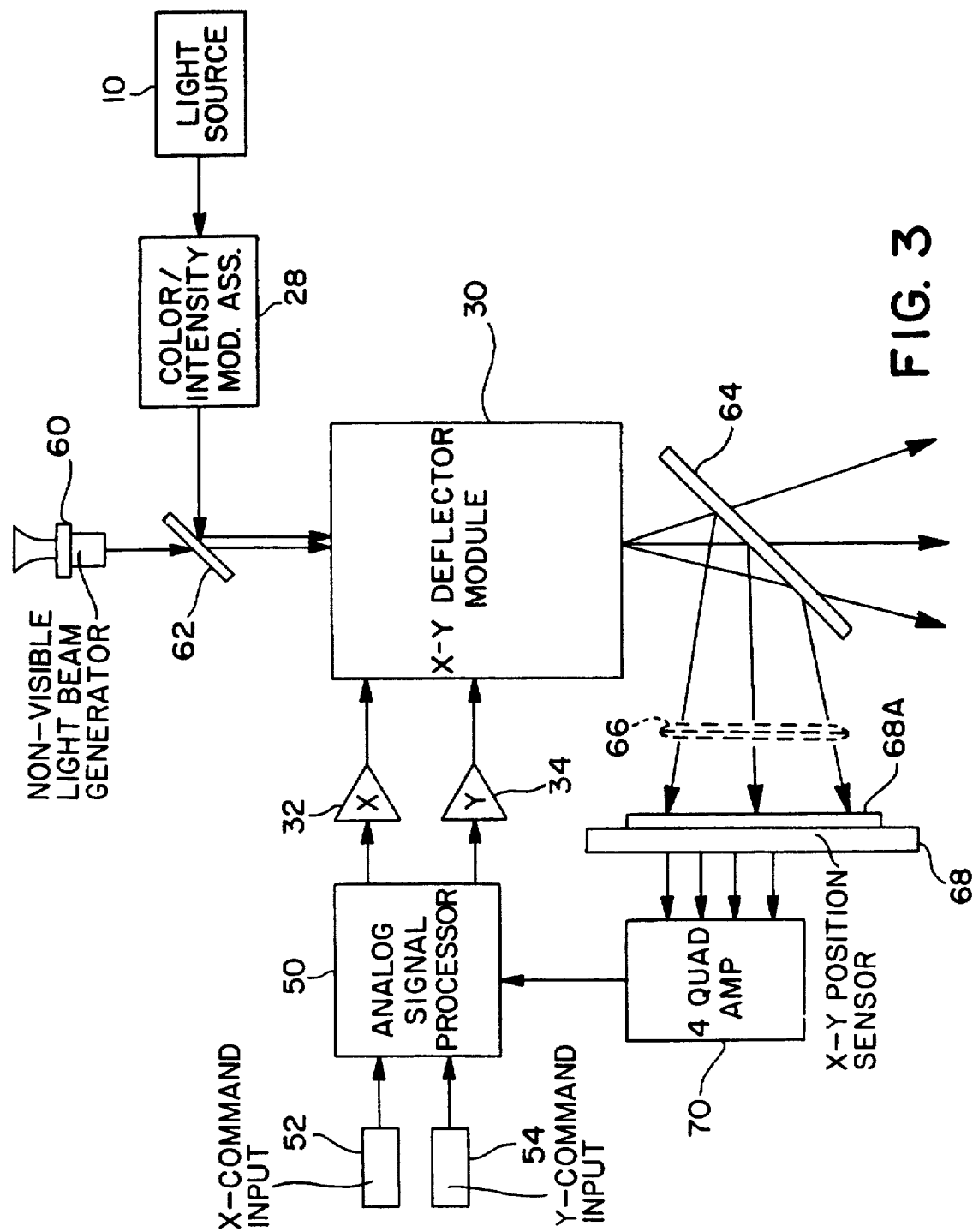
FIG. 3 is a block diagram of the x-y color modulation and deflector assembly with a optical sensor or feedback system.

Referring to FIG. 3, a preferred embodiment of the projection system is depicted disclosing the feedback created by optical sensor system 36 in greater detail. Light source 10 provides a poly-chromatic light beam comprising the three primary colors to color modulation/intensity modulation assembly 28 to produce a full-color modulated beam of light. The light beam leaving assembly 28 is reflected by a beam combining dichroic filter 62 into deflector module 30. In another embodiment, as depicted in FIG. 1B, the light beam could be reflected by filter 62 into deflector module 30 after leaving lens array 18. A non-visible light beam, such as a laser diode or HeNe infrared beam or a non-laser infrared beam, is generated by a non-visible light beam generator 60. The non-visible beam passes through filter 62 and is mixed and collinear with the light beam as it enters deflector module 30. Alternatively, dichoic filter 62 can be oriented, such that the light beam leaving assembly 28 passes through filter 62, and the non-visible light beam is mixed and becomes collinear with the visible light beam when it is reflected by filter 62. The other components of sensor system 36 would have to be re-oriented accordingly. In FIG. 3, however, x and y deflectors (not shown) are driven by an analog signal processor 50 which receives x-command input 52 and y-command input 54 and supplies command signals to x-power amplifier 32 and y-power amplifier 34.

As the deflected, mixed light beam leaves deflector module 30, the beam contacts a beam separation dichroic filter 64 which allows the visible portion of the mixed beam to pass while reflecting the non-visible portion. As similarly noted above, the components of sensor system 36 could be re-oriented, such that the visible light beam is reflected, by dichroic filter 64 and the non-visible light beam is allowed to pass through filter 64. As depicted in FIG. 3, however, the full-color modulated, x-y deflected beam enters scan field flattening lens array 38 while the non-visible beam is reflected against an x-y position sensor 68. In another embodiment, the non-visible beam passes through a position sensor enhancing lens 66 before contacting position sensor 68. When the non-visible light beam contacts position sensor 68, an electrical signal is produced which is equal to the position of the non-visible beam on position sensor surface 68A. This electrical signal is summed into x-command input 52 and y-command input 54 by a four (4) quad amplifier 70 and analog signal processor 50. This summing detects any misalignment, degradation, or distortion of the images and completes a feedback loop by which the performance of deflector module 30 can be adjusted and improved, and the deflection speed of module 30 can consequently be increased.

Figure 4:
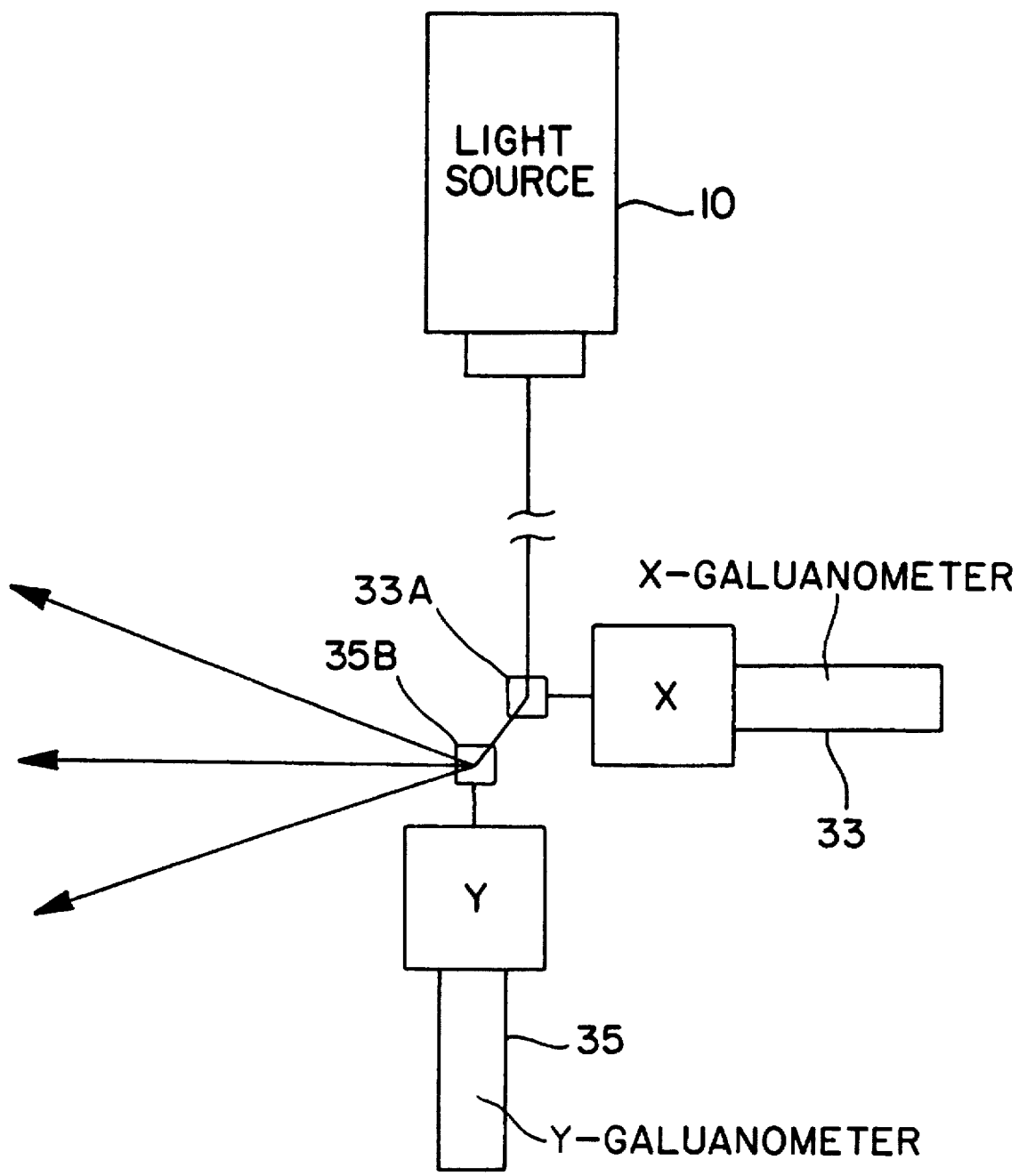
FIG. 4 is a block diagram of an electro-mechanical deflector module depicting an x-galvanometer and a y-galvanometer.

Finally, referring to FIG. 4, a preferred embodiment of x-y deflector module 30 is depicted in which electro-mechanical deflectors are employed to deflect the light beam in the x and y axes. As we noted above, an acousto-optic or an electro-optic deflector or deflectors, as well as electro-mechanical deflectors, are suitable for use with this system. In an acousto-optic deflector, the frequency of acoustic waves applied to the optical medium determines the degree of deflection, usually about plus or minus three (+3) degrees optical. The method of deflection is also usually Bragg diffraction, i.e., only one diffracted beam is produced, although other methods may be used. Preferably, electro-optic deflectors deflect light beams by changing the optical medium's index of refraction. By changing the index of refraction, the beams are bent in unison and are deflected, i.e., their scan angle is changed. This may be accomplished by use of an electro-optic crystal prism or multiple electro-optic crystal prisms stacked in an end to end fashion. Alternatively, electro-optic deflectors may deflect light beams by changing the optical medium's polarization properties. When deflection is achieved by changing polarization properties, a birefringent prism, which splits a light beam into components which travel at different velocities, may be used. The amount of deflection is usually about plus or minus six-tenths (+0.6) of a degree optical, e.g., about three (3) micro-radians per volt optical deflection. Because a preferred embodiment of the system operates at plus or minus about three thousand (3K) volts the electro-optic deflector can achieve about plus or minus about nine thousand (9K) micro-radians deflection or plus or minus about 0.516 degrees optical.

The efficiency of acousto-optic deflectors may be as high as about 85%. Nevertheless, when used in x-y deflector module 30, the total efficiency of deflector module 30 may only be about 30% of total light beam transmission. The efficiency of electro-optic deflectors may be as high as about 90%, and when use in x-y deflector module 30, the total efficiency may still be as high as about 80%, depending on the type of electro-optic interaction employed. Regardless, however, whether an acousto-optic or an electro-optic deflector or deflectors is (are) used, additional optics (hereinafter "relay optics") may be required to obtain satisfactory results when using these deflectors in a wide angle projection system. These relay optics are comprised of expansion and reduction optics and serve to increase system efficiency and to multiply the light beam deflection angles regardless of the beam's end use. As the deflection angles obtainable with acousto-optic and electro-optic deflectors continue to increase with improvements in technology, the need for relay optics is expected to diminish and possibly disappear.

As depicted in FIG. 4, x-y deflector module 30 employs an x-galvanometer 33 equipped with an x-oscillating mirror 33A and a y-galvanometer 35 equipped with a y-oscillating mirror 35B. Electro-mechanical deflectors must be driven at relatively high speeds in order to obtain high resolution and intensity and clarity of images. This, however, causes heat to build up within the deflectors. Moreover, because of the high speed of operation and oscillations, dampening problems arise. Suitable galvanometers should have the ability to overcome these heat and dampening problems. Using a magnetic, heat transfer fluid in the galvanometers may reduce or eliminate the heat transfer and dampening problems, and improved deflector performance and greater image resolution may thereby be achieved.

Although a detailed description of the present invention has been provided above, it is to be understood that the scope of the invention is not to be limited thereby, but is to be determined by the claims which follow.

We claim:

1. A projection system for projecting an image, wherein said image is defined in vector coordinates, onto a geometric viewing surface located at a predetermined distance from and positioned at a predetermined orientation relative to said system comprising:

a source of an intense light beam;

a vector scanning deflector module for deflecting said light beam to said vector coordinates in a pair of cartesian axes at an exit angle of deflection of said light beam; and a wide angle lens array for increasing said exit angle of deflection by a predetermined factor and projecting said image on said viewing surface.

2. The projection system of claim 1 wherein said wide angle lens array comprises a wide angle lens.

3. The projection system of claim 1 wherein said light beam is broadband.

4. The projection system of claim 3 wherein said source comprises a laser.

5. The projection system of claim 4 wherein said source comprises an arc lamp.

6. The projection system of claim 1 wherein said deflector module comprises a pair of electro-mechanical deflectors which deflect said light beam to vector coordinates in an x-axis and a y-axis.

7. The projection system of claim 1 wherein said deflector module comprises at least one acousto-optic deflector capable of deflecting said light beam to vector coordinates in an x-axis and a y-axis.

8. The projection system of claim 1 wherein said deflector module comprises at least one electro-optic deflector capable of deflecting said light beam to vector coordinates in an x-axis and a y-axis.

9. A projection system for projecting an image, wherein said image is defined in vector coordinates, onto a geometric viewing surface located at a predetermined distance from and positioned at a predetermined orientation relative to said system comprising:

a source of an intense light beam;

a deflector module for deflecting said light beam to said vector coordinates in a pair of cartesian axes at an exit angle of deflection of said light beam, wherein said source is coupled directly to said deflector module; and a wide angle lens array for increasing said exit angle of deflection by a predetermined factor and projecting said image on said viewing surface.

10. The projection system of claim 9 wherein said wide angle lens array comprises a wide angle lens.

11. A projection system for projecting an image, wherein said image is defined in vector coordinates, onto a geometric viewing surface located at a predetermined distance from and positioned at a predetermined orientation relative to said system comprising:

a source of an intense light beam;

a deflector module for deflecting said light beam to said vector coordinates in a pair of cartesian axes at an exit angle of deflection of said light beam; and a wide angle lens array for increasing said exit angle of deflection by a predetermined factor and projecting said image on said viewing surface, wherein said wide angle lens array comprises a first and a second lens array such that said first lens array projects said image spatially on a focal plane and said second lens array comprises a wide angle lens and projects said spatial image on said viewing surface.

12. The projection system of claim 11 wherein said light beam is mono-chromatic.

13. The projection system of claim 12 wherein said source comprises a laser.

14. The projection system of claim 12 wherein said source comprises an arc lamp.

15. The projection system of claim 11 wherein said light beam is transferred to said deflector module by beam transfer means comprising a fiber optic path.

16. The projection system of claim 11 wherein said source is coupled directly to said deflector module.

17. The projection system of claim 11 wherein said deflector module comprises a pair of electro-mechanical deflectors which deflect said light beam to vector coordinates in an x-axis and a y-axis.

18. The projection system of claim 17 wherein said light beam is transferred to said deflector module by beam transfer means comprising a fiber optic path.

19. The projection system of claim 18 wherein said deflector module comprises an x-galvanometer for deflecting said light beam in said x-axis and a y-galvanometer for deflecting said light beam in said y-axis.

20. The projection system of claim 17 wherein said deflector module comprises an x-galvanometer for deflecting said light beam in said x-axis and a y-galvanometer for deflecting said light beam in said y-axis.

21. The projection system of claim 8 wherein said deflector module comprises at least one acousto-optic deflector capable of deflecting said light beam to vector coordinates in an x-axis and a y-axis.

22. The projection system of claim 11 wherein said deflector module comprises at least one electro-optic deflector capable of deflecting said light beam to vector coordinates in an x-axis and a y-axis.

23. The projection system of claim 11 wherein said image is a computergraphic display defined in digital vector coordinates which determine a trajectory for said display, further comprising:

an image generating device for manipulating said display;

a processor for translating said digital vector coordinates into analog signals and repetitively transmitting said display at a rate above the flicker rate;

a geometric correction device for correcting said analog signals, thereby compensating for said viewing surface's shape and said distance and said orientation of said viewing surface relative to said system;

amplification circuitry for controlling the deflection of said light beam; and beam transfer means for providing said light beam to said deflector module.

24. The projection system of claim 23 wherein said deflector module comprises a pair of electro-mechanical deflectors which deflect said light beam to vector coordinates in an x-axis and a y-axis.

25. The projection system of claim 24 wherein said deflector module comprises an x-galvanometer for deflecting said light beam in said x-axis and a y-galvanometer for deflecting said light beam in said y-axis.

26. The projection system of claim 25 wherein said beam transfer means comprises a fiber optic path.

27. The projection system of claim 23 wherein said beam transfer means further comprises a fiber optic path with an input and an output coupling for transferring said light beam from said source to said deflector module via a focusing and collimating lens array.

28. The projection system of claim 27 wherein said geometric viewing surface is spherical and said second lens array is positioned at a location about equidistant from said surface.

29. The projection system of claim 11 wherein said image is a computergraphic display defined in analog vector coordinates which determine a trajectory for said display, further comprising:

an image generating device for manipulating said display;

a processor for repetitively transmitting said display at a rate above the flicker rate;

a geometric correction device for correcting said analog coordinates, thereby compensating for the geometry of said viewing surface and said distance and said orientation of said viewing surface relative to said system;

amplification circuitry for controlling the deflection of said light beam; and beam transfer means for providing said light beam to said deflector module.

30. The projection system of claim 29 wherein said deflector module comprises a pair of electro-mechanical deflectors which deflect said light beam to vector coordinates in an x-axis and a y-axis.

31. The projection system of claim 30 wherein said deflector module comprises an x-galvanometer for deflecting said light beam in said x-axis and a y-galvanometer for deflecting said light beam in said y-axis.

32. The projection system of claim 31 wherein said beam transfer means comprises a fiber optic path.

33. The projection system of claim 29 wherein said beam transfer means further comprises a fiber optic path with an input and an output coupling for transferring said light beam from said source to said deflector module via a focusing and collimating lens array.

34. The projection system of claim 33 wherein said geometric viewing surface is spherical and said second lens array is positioned at a location about equidistant from said surface.

35. A projection system for projecting a computergraphic display defined in digital vector coordinates which determine a trajectory for said display onto a geometric viewing surface, comprising:

an image generating device for manipulating said display;

a processor for translating said digital vector coordinates into analog signals and repetitively transmitting said display at a rate above the flicker rate;

a geometric correction device for correcting said analog signals thereby compensating for the geometry of said viewing surface;

a broadband, gas ion laser for producing an intense, coherent light beam;

amplification circuitry for controlling the deflection of said light beam;

a deflector module for deflecting said light beam to said vector coordinates in a pair of cartesian axes at an exit angle of deflection comprising an x-galvanometer for deflecting said light beam in said x-axis and a y-galvanometer for deflecting said light beam in said y-axis;

beam transfer means for providing said beam to said deflector module, comprising a fiber optic path with an input coupling for accepting said light beam and an output coupling for delivering said light beam to a focusing and collimating lens array and a color modulator for separating said light beam into primary colors, modulating each of said primary colors independently, and re-combining said primary colors, and a wide angle lens array for increasing said exit angle of deflection by a predetermined factor and projecting said display on said viewing surface comprising a first and a second lens array, such that said first lens array projects said display spatially on a focal plane and said second lens array comprises a wide angle lens and focuses said spatial display on said viewing surface, wherein said viewing surface surrounds and each point on said viewing surface is about equidistant from said second lens array.

36. The projection system of claim 35 wherein said geometric viewing surface is spherical and said wide angle lens is positioned about equidistant from each point on said viewing surface.

37. The projection system of claim 36 wherein said exit angle of deflection of said deflected beam in a range of about twenty (20) to about eighty (80) degrees and said lens array increases said exit angle of deflection to a range of about 160 to at least 180 degrees.

38. The projection system of claim 35 wherein said exit angle of deflection of said deflected beam in a range of about twenty (20) to about eighty (80) degrees and said lens array increases said exit angle of deflection to a range of about 160 to at least 180 degrees.

* * * * *